United States Patent
Jian

(10) Patent No.: US 7,430,786 B1
(45) Date of Patent: Oct. 7, 2008

(54) TRIPLE POSITIONING HINGE

(75) Inventor: Jia-Yan Jian, Shulin (TW)

(73) Assignee: Shin Zu Shing Co., Ltd., Taipei Hsien (TW)

( * ) Notice: Subject to any disclaimer, the term of this patent is extended or adjusted under 35 U.S.C. 154(b) by 0 days.

(21) Appl. No.: 11/785,940

(22) Filed: Apr. 23, 2007

(51) Int. Cl.
*E05D 7/00* (2006.01)
(52) U.S. Cl. .............................. 16/330; 16/303; 16/341; 361/681
(58) Field of Classification Search ................... 16/330, 16/329, 328, 327, 321, 319, 377, 277, 303, 16/331, 332, 334, 337, 341, 374; 361/814, 361/683, 682, 681; 455/90.3, 550.1, 575.8, 455/575.4, 575.3, 575.1; 379/433.12, 433.13; 348/333.06, 373; 248/920, 921, 922, 923
See application file for complete search history.

(56) References Cited

U.S. PATENT DOCUMENTS 6,954,221 B2* 10/2005 Wu .............................. 361/681
2003/0122046 A1* 7/2003 Huong .................... 248/291.1

* cited by examiner

*Primary Examiner*—J. Allen Shriver
*Assistant Examiner*—Matthew J Sullivan
(74) *Attorney, Agent, or Firm*—Bacon & Thomas P.L.L.C.

(57) ABSTRACT

A triple positioning hinge that is compact and securely retains a monitor of a portable electronic device at three determined positions permanently. The triple positioning hinge has a body, a pivoting member, a first positioning element, a second positioning element and a resilient element. The first positioning element has multiple detents formed on a surface of the first positioning element. The second positioning element is pushed toward the first positioning element by the resilient element and has three positioning notches circularly formed in a surface at intervals and respectively correspond to and engage with the detents of the first positioning element to hold the monitor connected with the pivoting member at three determined positions.

3 Claims, 7 Drawing Sheets

TRIPLE POSITIONING HINGE

BACKGROUND OF THE INVENTION

1. Field of the Invention

The present invention relates to a hinge, and more particularly to a triple positioning hinge that is compact and securely retains a monitor of a portable electronic device at three determined positions permanently.

2. Description of Related Art

A hinge is mounted between a base and a monitor of a portable electronic device and allows the monitor to rotate relative to the base for convenience of use.

Later, the hinges are further designed to have positioning elements that help the monitor of the portable electronic device to hold the monitor at an optimum angle to facilitate users to watch. However, the positioning elements of the conventional hinge normally positions the monitor at a single angle, so if the monitor is required to be position at a folded and an unfolded positions, the conventional hinge has to be provided with extra retaining components. As a result, the conventional hinges are generally constructional complicated and bulky. Moreover, deformation may occur in the components of the conventional hinges after a long-term of use and gradually cause the conventional hinges to lose the ability of securely holding the monitors.

To overcome the shortcomings, the present invention provides a triple positioning hinge to obviate or mitigate the aforementioned problems.

SUMMARY OF THE INVENTION

The main objective of the present invention is to provide a triple positioning hinge that is compact and securely retains a monitor of a portable electronic device at three determined positions permanently.

To achieve the objective, the triple positioning hinge in accordance with present invention comprises a body, a pivoting member, a first positioning element, a second positioning element and a resilient element.

The body is adapted to be mounted in a base of a portable electronic device and has a pivoting hole.

The pivoting member is adapted to be mounted in a monitor of the portable electronic device and has a pintle that is mounted rotatably through the pivoting hole of the body and therefore allows the monitor to pivot relative to the base.

The first positioning element is mounted securely in the body and has a through hole, a surface and multiple detents. The through hole is coaxial with the pivoting hole. The detents are formed on the surface around the through hole.

The second positioning element is mounted securely on the pintle of the pivoting member, is simultaneously rotated with the pintle and has a surface corresponding to the surface of the first positioning element and three positioning notches. The positioning notches circularly formed in the surface at intervals and correspond respectively to the detents of the first positioning element when the pivoting member is rotated.

The resilient element is mounted around the pintle and has a first end and a second end. The first end abuts the pivoting member. The second end abuts the second positioning element and pushes the second positioning element toward the first positioning element to make the detents sequentially engaging with the positioning notches so as to hold the monitor at three determined positions (may be at a folded position, an upright position and an unfolded position).

With such an arrangement, the hinge in accordance with present invention positions the monitor at three positions without any of the extra retaining components. Thus, the hinge is compact and simple in structure. Moreover, with the resilient element assisting the positioning elements to engage with each other, the triple positioning hinge effectively ensures the monitor being securely held at optimum angles even after a long-term of use.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
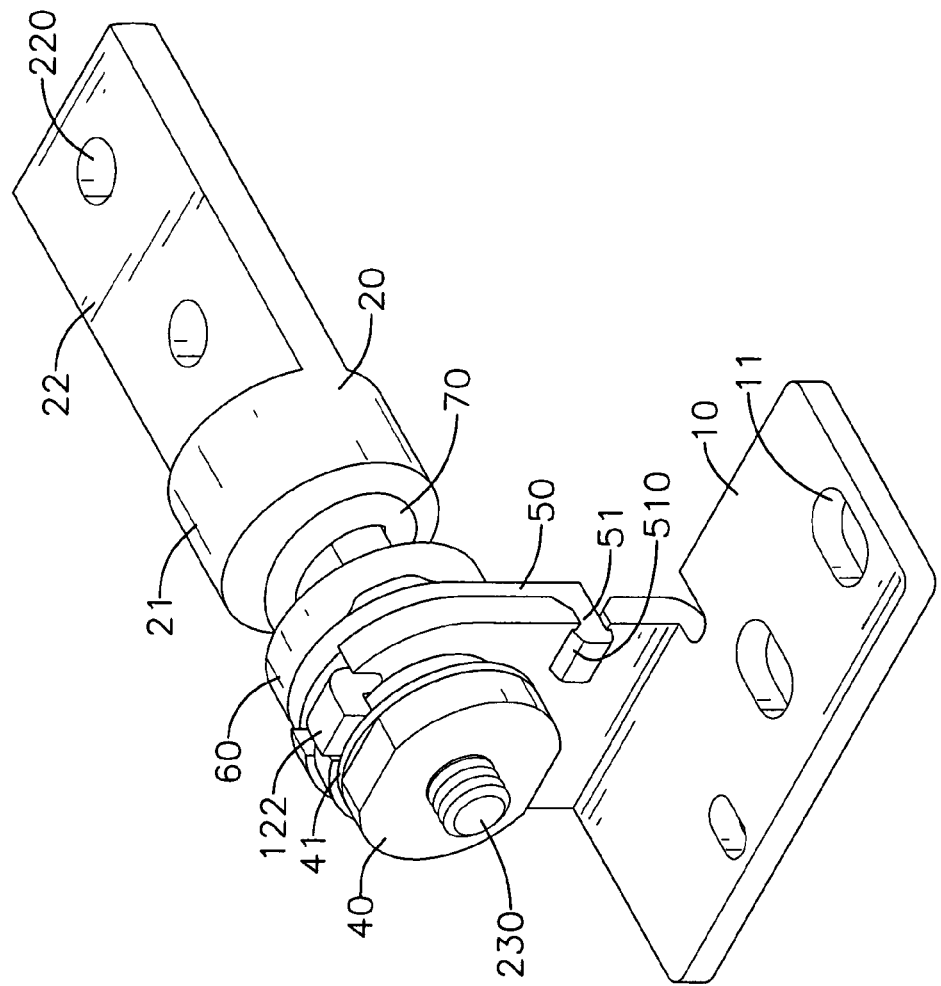
FIG. 1 is a perspective view of a triple positioning hinge in accordance with the present invention.
Figure 2:
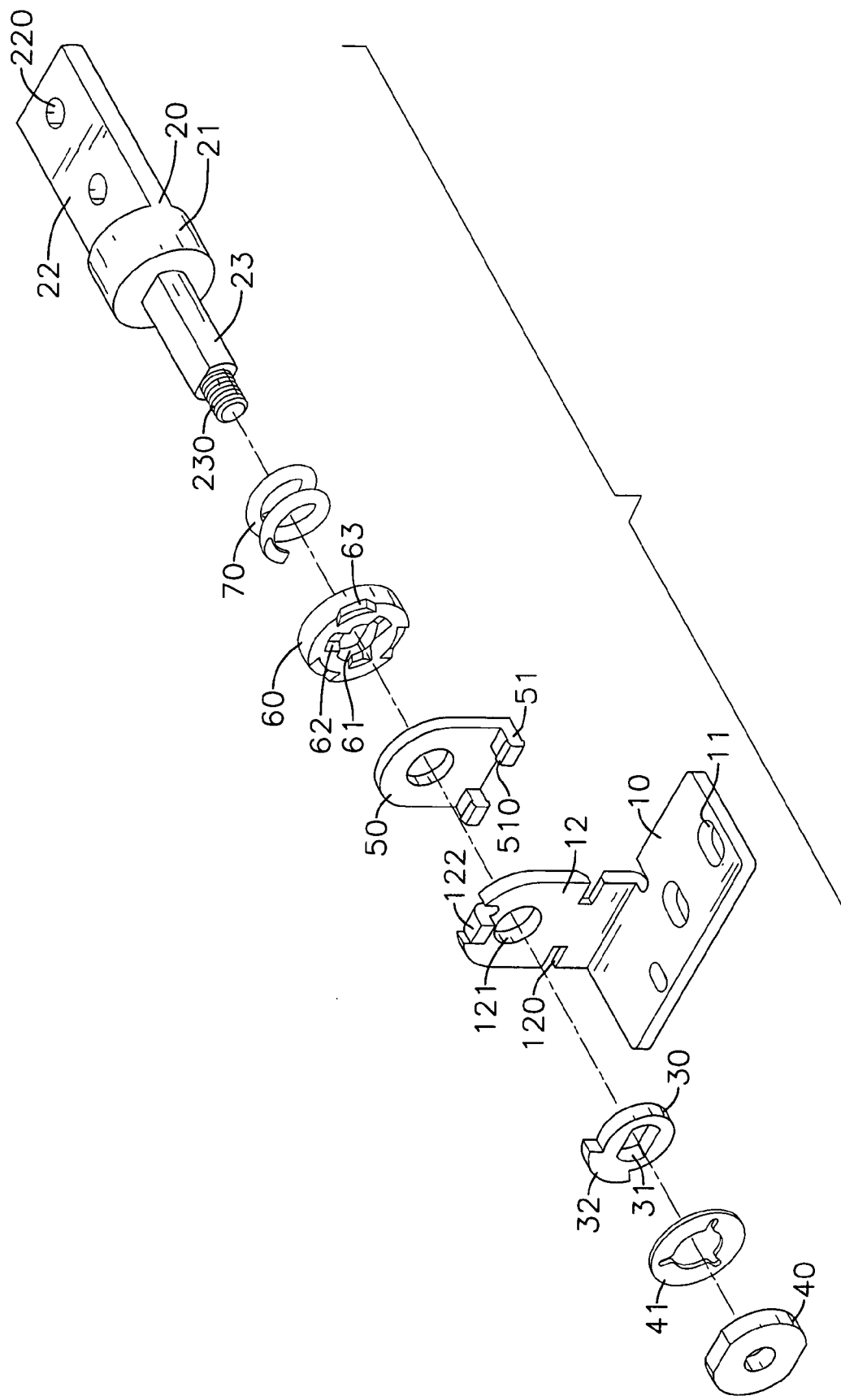
FIG. 2 is an exploded perspective view of the triple positioning hinge in FIG. 1.
Figure 3:
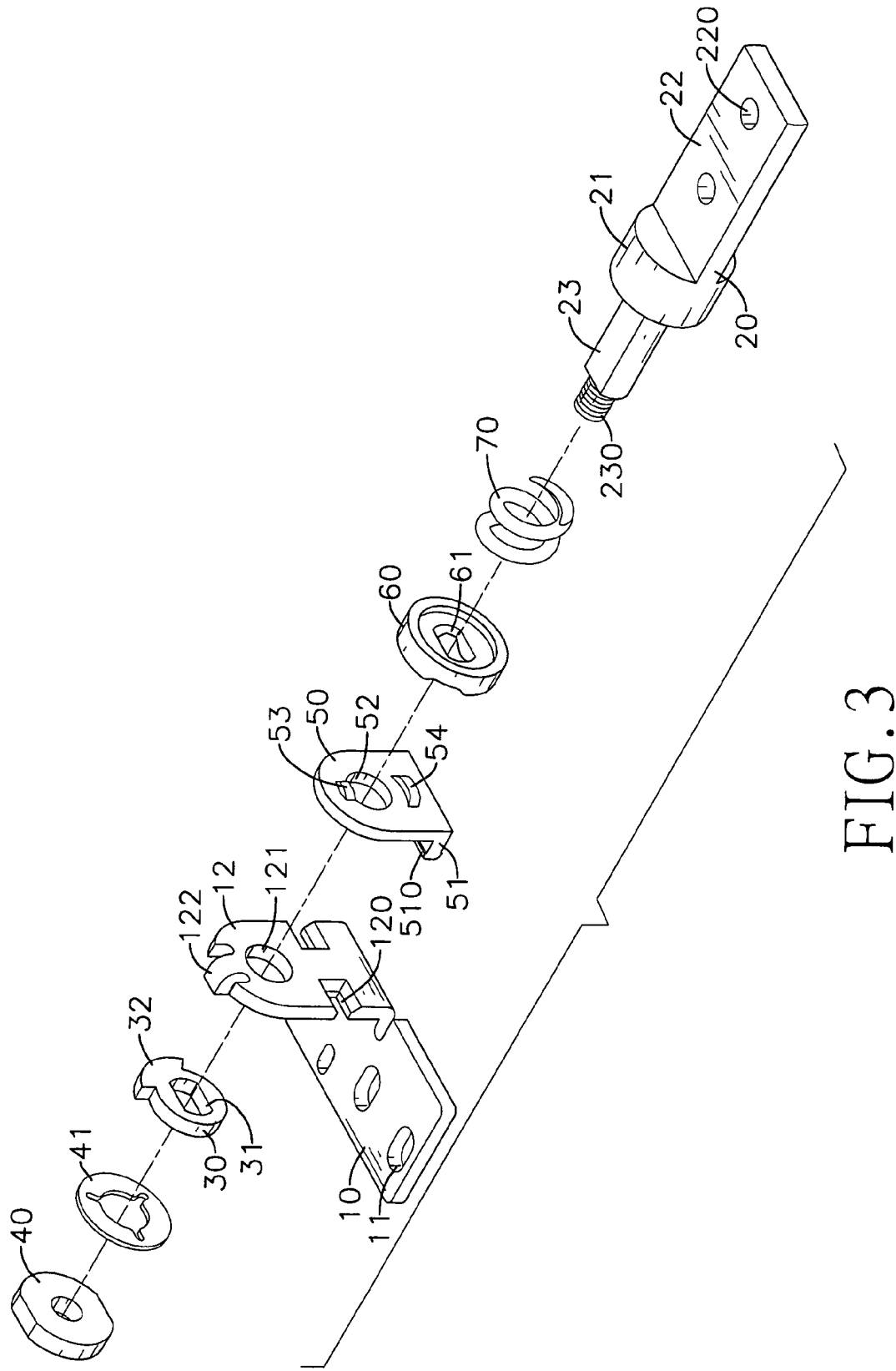
FIG. 3 is an another exploded perspective view of the triple positioning hinge in FIG. 1.

With reference to FIGS. 1, 2, 3 and 6, the triple positioning hinge in accordance with present invention comprises a body (10), a pivoting member (20), a limit (30), a first positioning element (50), a second positioning element (60), a resilient element (70), a fixing element (40) and a washer (41).

The body (10) is mounted securely in a base (81) of a portable electronic device (80) and has a mounting tab (12) and multiple fixing holes (11). The mounting tab (12) is perpendicularly formed on the body (10) and has a front surface, a rear surface, two sides, a top, two engaging notches (120), a pivoting hole (121) and a protrusion (122). The engaging notches (120) are formed on the sides of the mounting tab (12) opposite to each other. The pivoting hole (121) is formed through the mounting tab (12). The protrusion (122) is formed on the top of the mounting tab (12) of the body (10) and protrudes from the front surface of the mounting tab (12). The fixing holes (11) are separately formed through the body (10) for securing the body (10) to the base (81) with fasteners.

The pivoting member (20) is mounted securely in a monitor (82) of the portable electronic device (80), is mounted rotatably on the mounting tab (12) of the body (10) and has a main bracket (21), a mounting portion (22) and a pintle (23). The main bracket (21) has a proximal end and a distal end. The mounting portion (22) protrudes from the distal end of the main bracket (21) and has multiple securing holes (220) for securing the mounting portion (22) to the monitor (82) with fasteners. The pintle (23) protrudes from the proximal end of the main bracket (21), is mounted rotatably through the pivoting hole (121) of the mounting tab (12) of the body (10), is non-circular in cross section and has a threaded end (230).

The limit (30) is mounted on the front surface of the mounting tab (12) and has a mounting hole (31) and a salient (32). The mounting hole (31) is formed through the limit (30) and is non-circular in cross section. The pintle (23) extends through and engages with the mounting hole (31), such that the limit (30) simultaneously rotates with the pivoting member (20). The salient (32) protrudes radially out from the limit (30), extends a radian and selectively abuts the protrusion (122) of the mounting tab (12) to limit the travel of the pivoting member (20).

Figure 4:
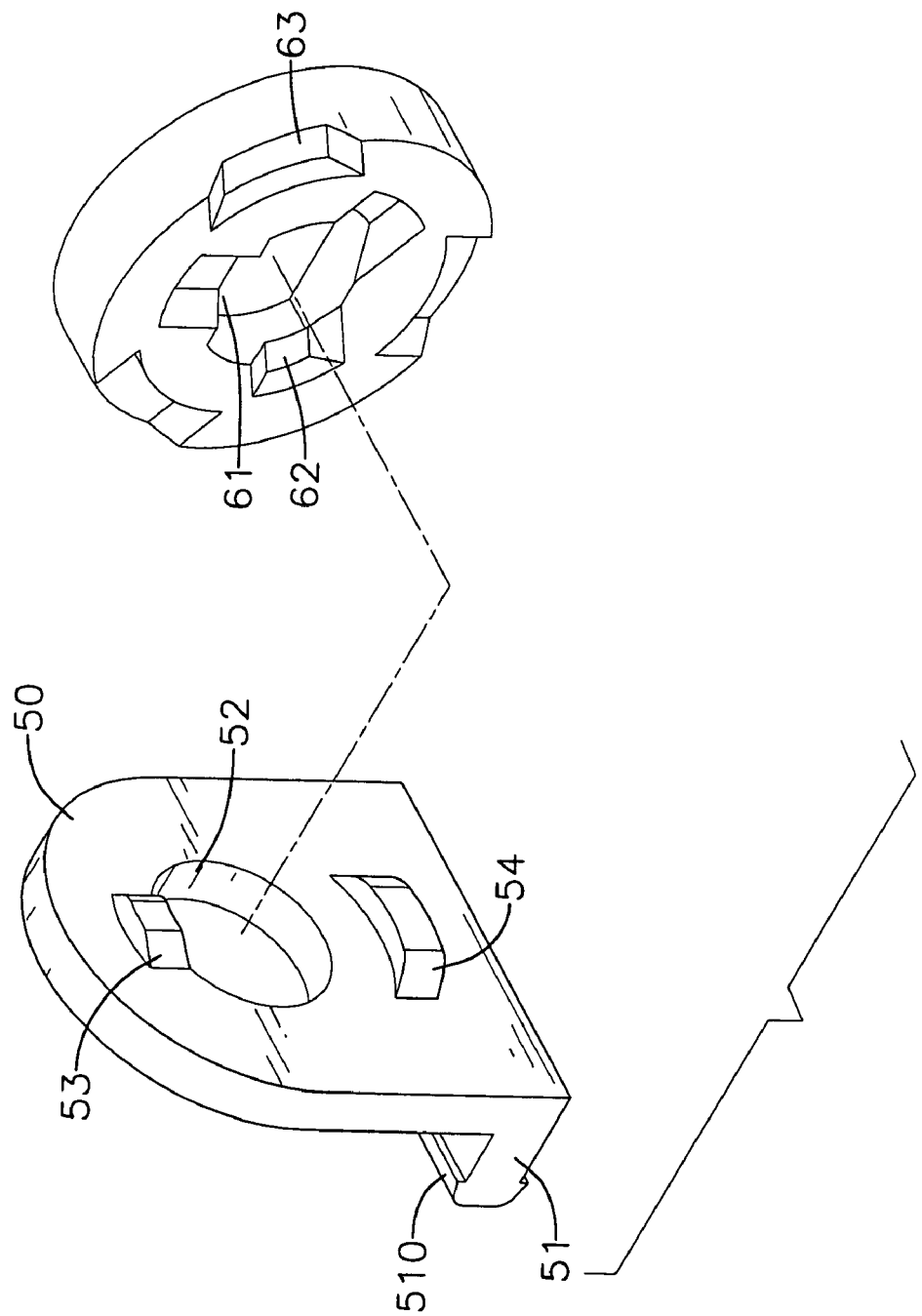
FIG. 4 is an enlarged exploded perspective view of the first positioning element and the second positioning element of the triple positioning hinge in FIG. 1.
Figure 5:
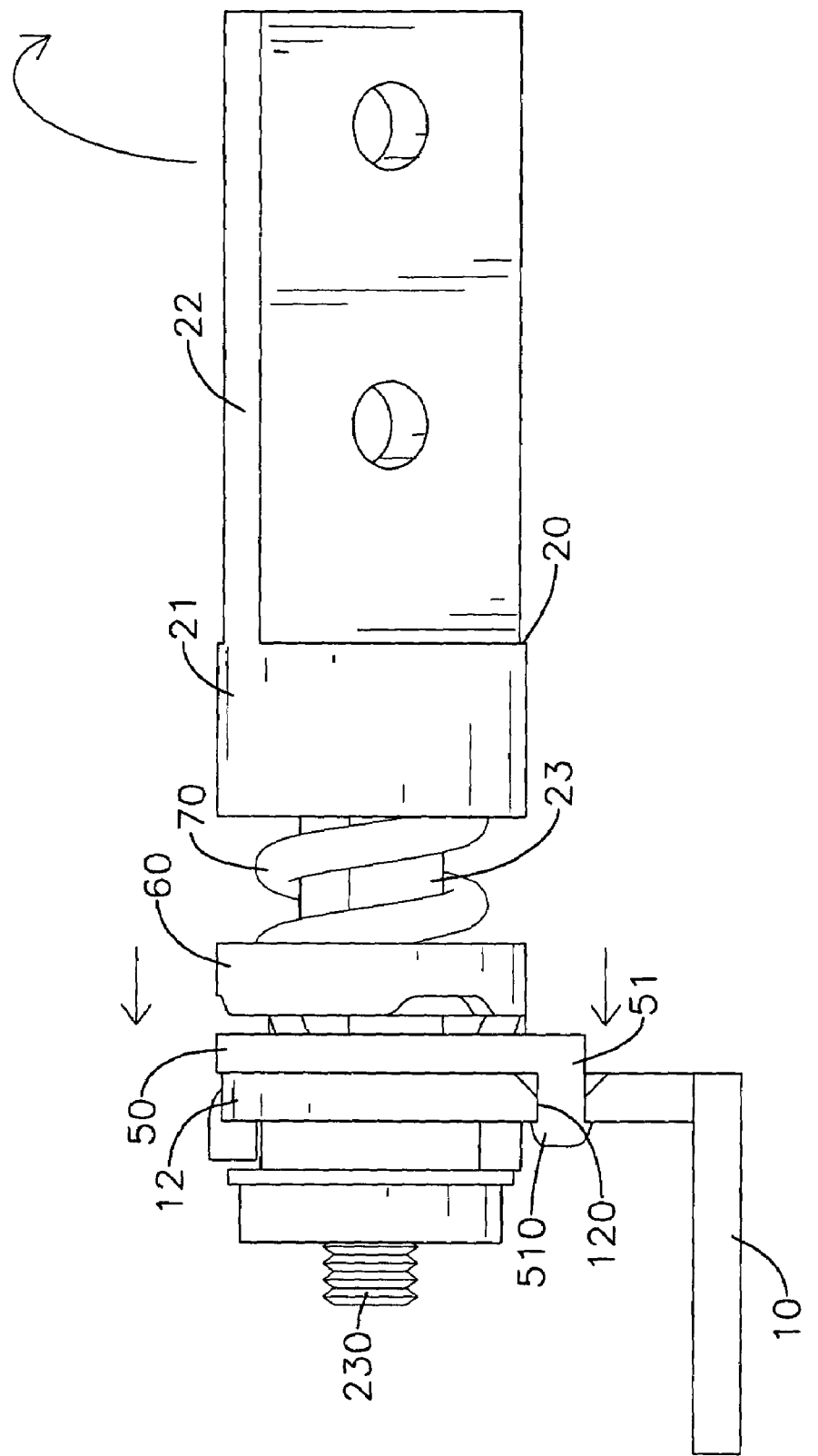
FIG. 5 is a side view of the triple positioning hinge in FIG. 1.
Figure 6:
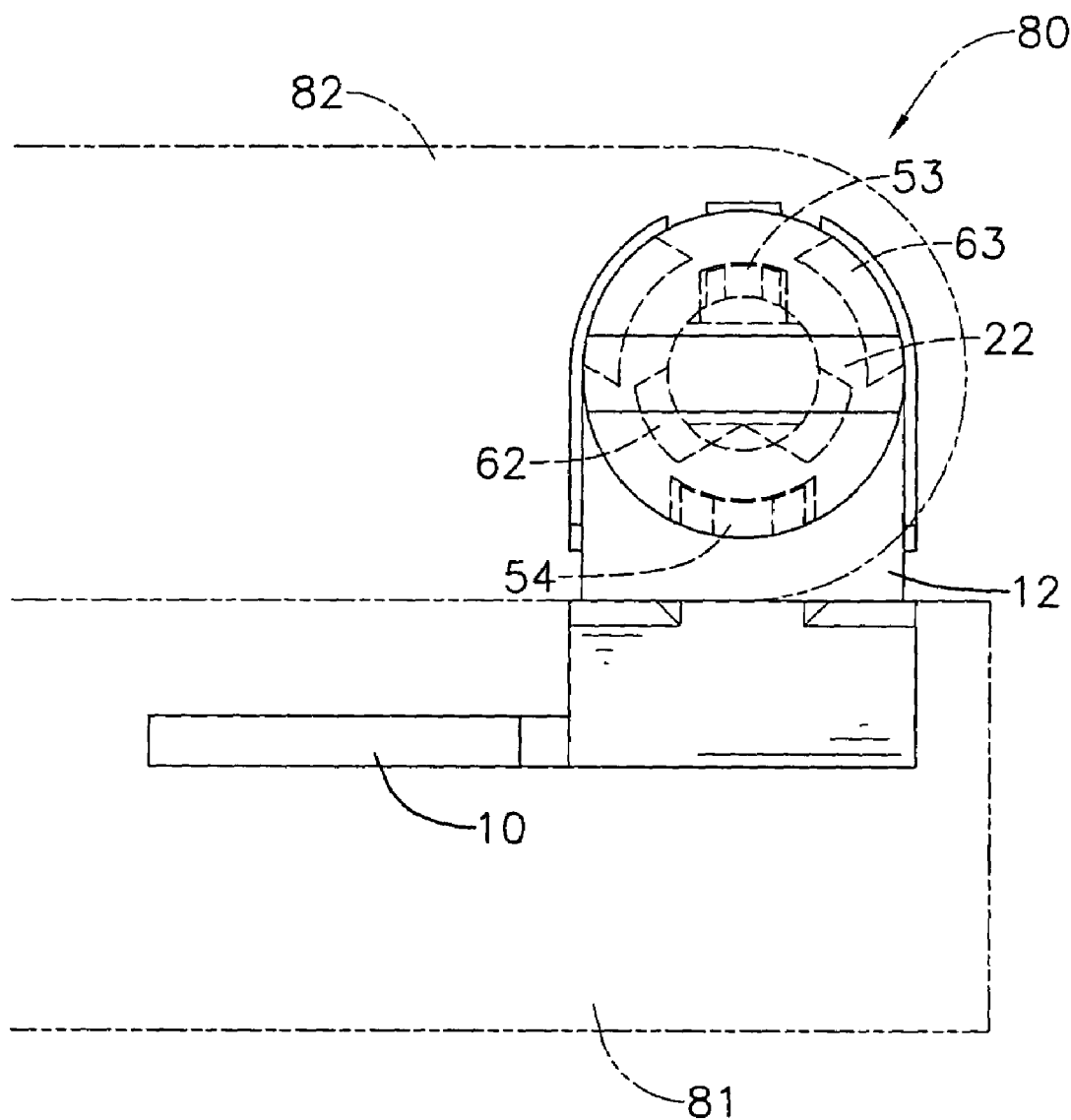
FIG. 6 is an operational end view of the triple positioning hinge in FIG. 1 mounted in a portable electronic device.
Figure 7:
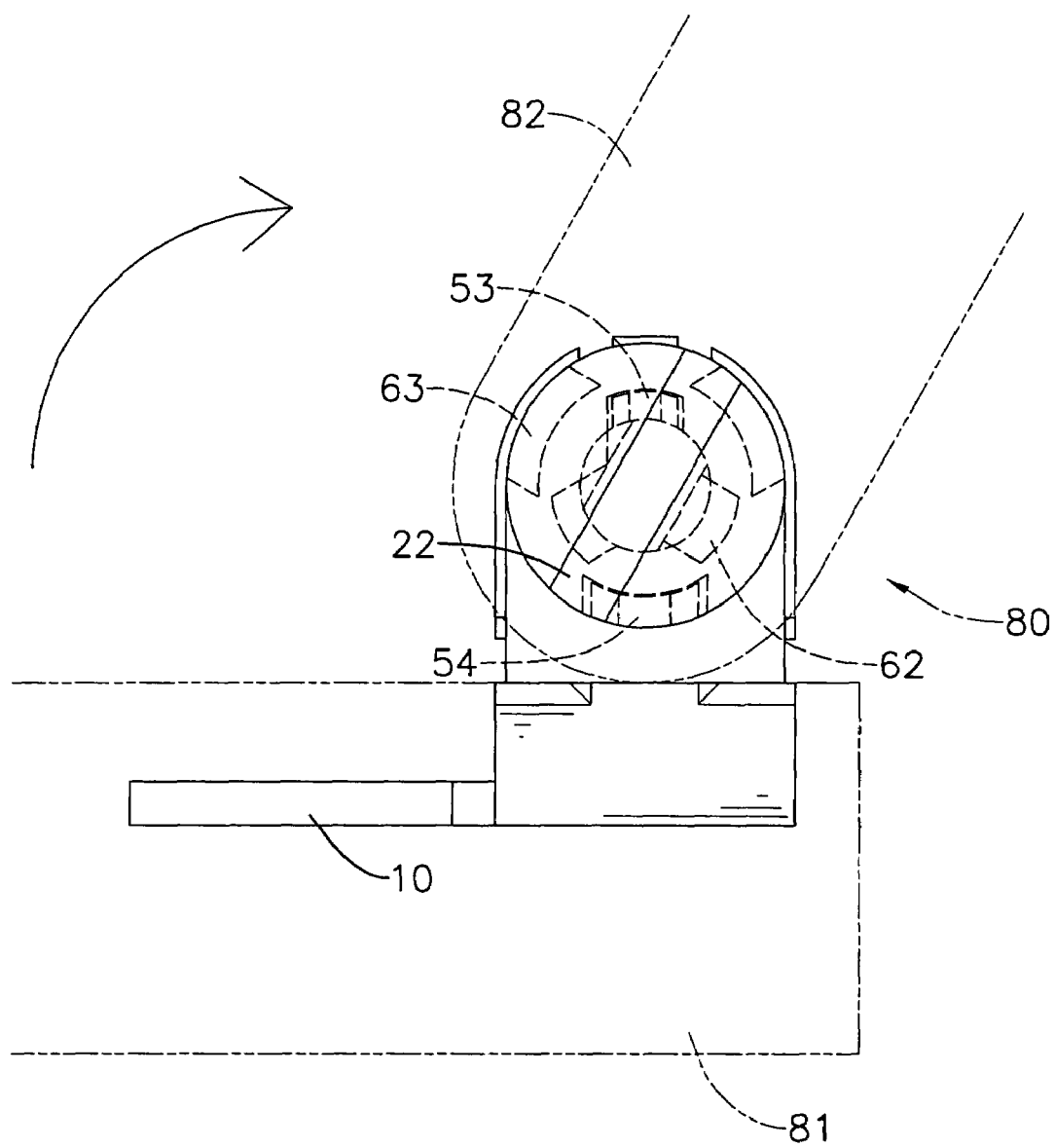
FIG. 7 is an another operational end view of the triple positioning hinge in FIG. 1 mounted in the portable electronic device.

With further reference to FIGS. 4 and 5, the first positioning element (50) is mounted securely on the mounting tab (12) of the body (10) and has a rear surface, a front surface, a bottom, two connectors (51), a through hole, an inner detent (53) and an outer detent (54). The connectors (51) protrude separately on the front surface near the bottom and extend through the engaging notches (120) of the mounting tab (12) respectively. Each connector (51) has a tooth (510) buckles the corresponding engaging notch (120) to hold the first positioning element (50) securely on the mounting tab (12). The through hold is formed through the first positioning element (50) and is coaxial with the pivoting hole (121) of the mounting tab (12). The rear surface has an inner area and an outer area defined around the through hole. The inner detent (53) is formed integrally on the inner area of the rear surface of the first positioning element (50). The outer detent (54) is formed integrally on the outer area of the rear surface of the first positioning element (50) opposite to the inner detent (53).

The second positioning element (60) is mounted on the pintle (23) of the pivoting member (20) and has a front surface, a center, an engaging hole (61), a rear surface, three inner positioning notches (62) and three outer positioning notches (63). The engaging hole (61) is formed through the center of the second positioning element (60), is non-circular in cross section and engages with the pintle (23), so as to make the second positioning element (60) simultaneously rotating with the pintle (23). The front surface corresponds to the rear surface of the first positioning element (50) and has an inner area and an outer area defined around the engaging hole (61). The inner positioning notches (62) are circularly formed in the inner area of the front surface of the second positioning element (60) at intervals and sequentially correspond to and selectively engage with the inner detent (53) of the first positioning element to retain the pivoting member (20) at three determined positions. The outer positioning notches (63) are circularly formed in the outer area of the front surface of the second positioning element (60) at intervals and are opposite to the inner positioning notches (62) respectively. The outer positioning notches (63) sequentially correspond to and selectively engage with the outer detent (54) of the first positioning element to provide an additional supporting effect to retain the pivoting member (20) at the three determined positions.

With further reference to FIG. 5, the resilient element (70) is mounted around the pintle (23) and has a first end and a second end. The first end abuts the proximal end of the main bracket (21) of the pivoting member (20). The second end abuts the rear surface of the second positioning element (60) and pushes the second positioning element (60) toward the first positioning element (50) to make the inner detent (53) and the outer detent (54) sequentially engage with the inner positioning notches (62) and outer positioning notches (63) so as to hold the monitor (82) at three determined positions.

The fixing element (40) may be a nut, is screwed onto the threaded end (230) of the pintle (23) and holds the limit (30), the first positioning element (50), the second positioning element (60), the resilient element (70) and the fixing element (40) on the pintle (23).

The washer (41) is mounted on the pintle (23) between the fixing element (40) and the limit (30) to prevent abrasion.

With reference to FIGS. 2, 5, 6, 7, when the monitor (82) of the portable electronic device (80) is rotated relative to the base (81), the inner detent (53) and the outer detent (54) will sequentially engage with the inner positioning notches (62) and outer positioning notches (63) respectively, so as to hold the monitor (82) in a folded position, an upright position and an unfolded position.

With such an arrangement, the hinge in accordance with present invention positions the monitor (82) at three positions without any of the extra retaining components. Thus, the hinge is compact and simple in structure. Moreover, with the resilient element (70) assisting the positioning elements (50, 60) to engage with each other, the triple positioning hinge effectively ensures the monitor (82) being securely held at optimum angles even after a long-term of use.

Even though numerous characteristics and advantages of the present invention have been set forth in the foregoing description together with details of the structure and function of the invention, the disclosure is illustrative only. Changes may be made in detail especially in matters of shape, size and arrangement of parts within the principles of the invention to the full extent indicated by the broad general meaning of the terms in which the appended claims are expressed.

What is claimed is:

1. A triple positioning hinge comprising
a body having
   a mounting tab being perpendicularly formed on the body and having
      a front surface;
      a rear surface;
      two sides;
      a top;
      two engaging notches formed in the sides of the mounting tab and opposite to each other;
      a pivoting hole being formed through the mounting tab; and
      a protrusion being formed on the top of the mounting tab of the body and protruding from the front surface of the mounting tab; and
   multiple fixing holes being separately formed through the body;
a pivoting member being mounted rotatably on the mounting tab of the body and having
   a main bracket having a proximal end and a distal end;
   a mounting portion protruding from the distal end of the main bracket and having multiple securing holes; and
   a pintle protruding from the proximal end of the main bracket, being mounted rotatably through the pivoting hole of the mounting tab of the body, being non-circular in cross section and having a threaded end;
a limit being mounted on the front surface of the mounting tab and having
   a mounting hole formed through the limit and being non-circular in cross section to allow the pintle to extend through and engage with the pintle; and
   a salient protruding radially out from the limit, and selectively abutting the protrusion of the mounting tab to limit a travel of the pivoting member;
a first positioning element being mounted securely on the mounting tab of the body and having
   a front surface,
   a bottom,
   two connectors protruding separately on the front surface near the bottom and extending through the engaging notches of the mounting tab respectively, each connector having a tooth buckling a corresponding one of the engaging notches to hold the first positioning element securely on the mounting tab;
a through hole formed through the first positioning element and coaxial with the pivoting hole of the mounting tab;
a rear surface having an inner area and an outer area defined around the through hole;
an inner detent being formed integrally on the inner area of the rear surface of the first positioning element; and
an outer detent being formed integrally on the outer area of the rear surface of the first positioning element and opposite to the inner detent;
a second positioning element being mounted on the pintle of the pivoting member and having
a rear surface;
a center;
an engaging hole formed through the center of the second positioning element, being non-circular in cross section and engaging with the pintle;
a front surface being corresponding to the rear surface of the first positioning element and having an inner area and an outer area defined around the engaging hole;
three inner positioning notches circularly formed in the inner area of the front surface of the second positioning element at intervals and sequentially corresponding to and selectively engaging with the inner detent of the first positioning element to retain the pivoting member at three positions; and
three outer positioning notches circularly formed in the outer area of the front surface of the second positioning element at intervals, opposite to the inner positioning notches respectively and sequentially corresponding to and selectively engaging with the outer detent of the first positioning element to provide an additional supporting effect to retain the pivoting member at the three positions;
a resilient element being mounted around the pintle and having
a first end abutting the proximal end of the main bracket of the pivoting member; and
a second end abutting the rear surface of the second positioning element and pushing the second positioning element toward the first positioning element to make the inner detent and the outer detent sequentially engaging with the inner positioning notches and outer positioning notches;
a fixing element being screwed onto the threaded end of the pintle and holding the limit, the first positioning element, the second positioning element, the resilient element and the fixing element on the pintle.

2. The triple positioning hinge as claimed in claim 1 further comprising a washer being mounted on the pintle between the fixing element and the limit to prevent abrasion.

3. The triple positioning hinge as claimed in claim 1, wherein the fixing element is a nut.

* * * * *